(12) United States Patent
Malaga (10) Patent No.: US 9,094,087 B2
(45) Date of Patent: Jul. 28, 2015

(54) REDUCED AIRCRAFT VHF COMMUNICATION ANTENNAS USING MULTI-CHANNEL VHF RADIOS

(71) Applicant: Honeywell International Inc., Morristown, NJ (US)

(72) Inventor: Alfonso Malaga, Sammamish, WA (US)

(73) Assignee: Honeywell International Inc., Morristown, NJ (US)

( * ) Notice: Subject to any disclaimer, the term of this patent is extended or adjusted under 35 U.S.C. 154(b) by 56 days.

(21) Appl. No.: 14/065,898

(22) Filed: Oct. 29, 2013

(65) Prior Publication Data

US 2015/0118983 A1    Apr. 30, 2015

(51) Int. Cl.
*H04B 1/16*    (2006.01)
*H04B 1/3822*    (2015.01)

(52) U.S. Cl.
CPC ............ *H04B 1/1638* (2013.01); *H04B 1/3822* (2013.01)

(58) Field of Classification Search
CPC ..................... H04B 1/0003; H04B 2001/3811; H04B 1/3805
See application file for complete search history.

(56) References Cited

U.S. PATENT DOCUMENTS 7,761,069 B1    7/2010 Studenberg, Jr. et al.
8,260,214 B2    9/2012 Marlett et al.
2008/0084861 A1    4/2008 Hunter
2010/0080236 A1    4/2010 Shawbaki
2012/0147929 A1    6/2012 Malaga et al.

FOREIGN PATENT DOCUMENTS

EP    2129006    2/2009
EP    2464024    6/2012

OTHER PUBLICATIONS

European Patent Office, "Extended European Search Report from EP Application No. 14187548.4 mailed May 28, 2015", from Foreign Counterpart of U.S. Appl. No. 14/065,898, May 28, 2015, pp. 19, Published in: EP.

*Primary Examiner* — Christian Hannon
(74) *Attorney, Agent, or Firm* — Fogg & Powers LLC (57) ABSTRACT

A multichannel two antenna radio unit device comprising a left very high frequency (VHF) radio and a right VHF radio is provided. The left VHF radio unit comprises a left VHF radio transceiver, the left VHF radio transceiver comprising a left wideband multi-channel receiver configured to receive voice channels and data channels in an aeronautical VHF communication band, the left VHF radio configured to communicate on at least two voice channels and at least one data channel. The right VHF radio comprises a right VHF radio transceiver, the right VHF radio transceiver comprising a right wideband multi-channel receiver configured to receive voice channels and data channels in an aeronautical VHF communication band, the right VHF radio configured to communicate on the at least two voice channels and the at least one data channel, and communicatively coupled to the left VHF radio unit via a bi-directional serial bus.

20 Claims, 5 Drawing Sheets

REDUCED AIRCRAFT VHF COMMUNICATION ANTENNAS USING MULTI-CHANNEL VHF RADIOS

BACKGROUND

Cellular wireless base stations are able to simultaneously support two-way communications with multiple mobile users on multiple channels using a single antenna without interference among the channels. Avoidance of cross-channel interference is possible because these cellular wireless frequency bands are either split into separate bands for transmit and receive—known as frequency division duplex operation, or the same band and channels are used for transmit and receive but the channels are divided into transmit and receive time slots which are synchronized in time so that all channels transmit or receive at the same time—known as time division duplex operation. By designing the cellular system so that mutual interference is avoided, cellular wireless base stations can then use multi-channel transmitters and receivers that share the same antenna to simultaneously transmit and/or receive on multiple channels.

The commercial aviation very high frequency (VHF) communication (COM) band has not been planned in a manner where a single antenna can be used to simultaneously support two-way communications on multiple channels. The aeronautical VHF COM band occupies a range from 118 MHz to 137 MHz. The VHF COM band is divided into channels that for any single two-way COM link, the same channel must be used for transmit or receive. Each channel can be used to communicate with multiple voice users using a push-to-talk discipline or for data link communications where the transmitting station must first sense whether the channel is being used before transmitting a message to another user. Interference among the various users that share the same channel is avoided in this manner. However when simultaneous voice and data communications on different channels must be supported, coordination between channels to avoid interference is not possible. Consequently aircraft are typically equipped with 3 VHF radios and 3 VHF antennas with each radio/antenna pair used to support a single voice or data COM link. The 3 antennas must be separated far enough so that when a transmission is made from one radio/antenna pair, the emissions from that antenna will not block reception on the other nearby radio/antenna pairs.

SUMMARY

In one embodiment, a multichannel communication system comprises a two-antenna radio device. The radio device further comprises a left VHF radio unit having at least one left VHF radio, each of the at least one left VHF radio comprising a left VHF radio transceiver, the left VHF radio transceiver comprising a left wideband multi-channel receiver configured to receive all voice channels and data channels in an aeronautical VHF communication band. The at least one left VHF radio is configured to communicate on at least any two voice channels and one data channel, via a left antenna communicatively coupled the left VHF radio unit. The two-antenna radio device also comprises a right VHF radio unit having at least one right VHF radio. Each of the at least one right VHF radio comprises a right VHF radio transceiver. The right VHF radio transceiver comprises a right wideband multi-channel receiver configured to receive all voice channels and data channels in an aeronautical VHF communication band, the at least one right VHF radio configured to communicate on at least any two voice channels and one data channel, the right VHF radio unit communicatively coupled to the left VHF radio unit via a bi-directional serial bus. A right antenna is communicatively coupled to the right VHF radio unit. The multichannel communication system also comprises an audio control panel configured to select the left VHF radio unit or right VHF radio unit to connect to an audio interface device, a radio tuning panel coupled to the left VHF radio unit and right VHF radio unit configured to select a voice communication frequency for each of two voice channels, provide a control signal instructing the left radio unit or right radio unit to switch between voice communication and data communication, and a data link management unit coupled to a visual interface device, the data link management unit configured to select a data communication frequency for the data channel, display received uplink data messages, and generate downlink data messages.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

Achieving enough antenna separation to support simultaneous operation on 2 VHF voice channels and 1 data link channel on smaller aircraft is very difficult if possible at all. Therefore with the future plans to use both voice and data link for air traffic control communications there is a need to devise a means to make it possible to support simultaneous voice and data operation on 3 or more VHF channels with fewer than 3 VHF antennas. Larger aircraft have on the other been able to support simultaneous operation on 3 VHF channels using 3 radio/antenna pairs. One of the benefits of using 3 radios, besides having the capability to support simultaneous operation on 3 voice or data channels, has been the ability to dispatch the aircraft with one failed radio and still be able to support voice and data link communications. Therefore, although future aircraft designs would benefit and welcome a reduction in the number of required VHF antennas, it would have to be done in a way in which the ability to dispatch the aircraft with one failed VHF radio is maintained.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1:
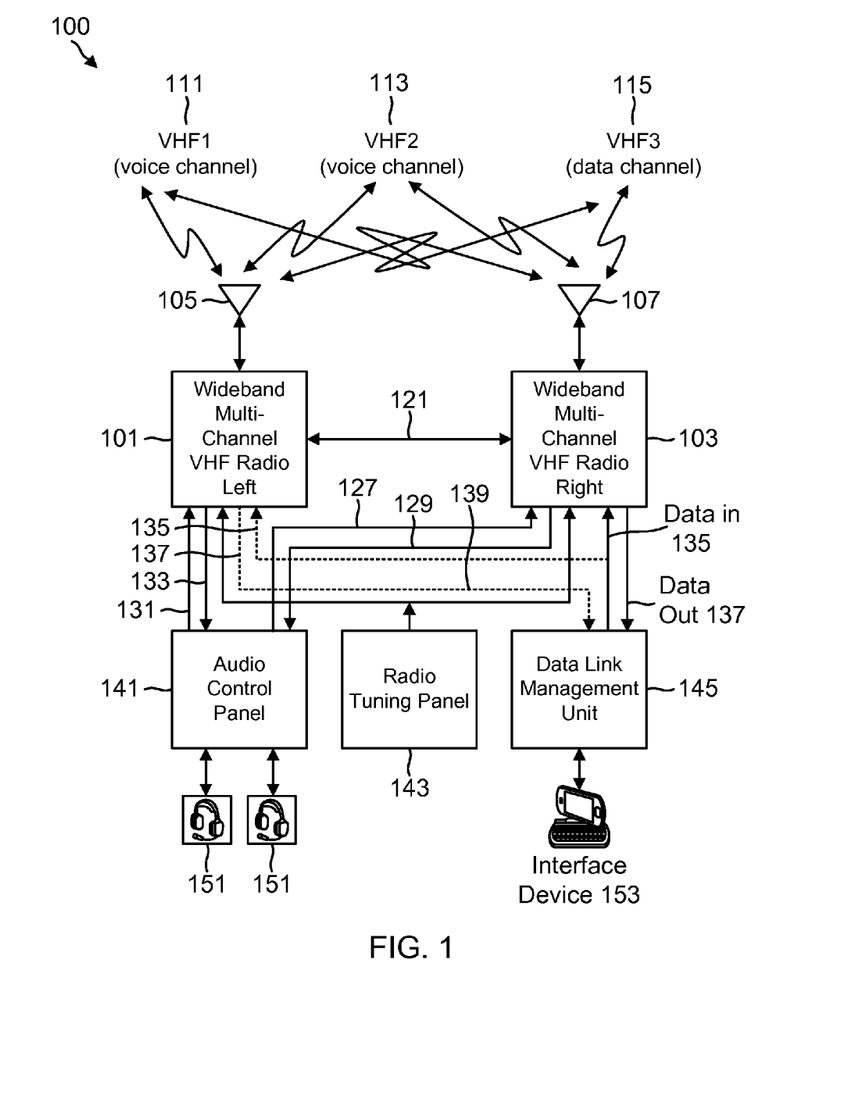
FIG. 1 illustrates one embodiment of 3-channel communication system using two reconfigurable VHF radios with narrowband transmitters.

FIG. 1 illustrates one embodiment of a 3-channel communication system using two VHF radios 100. The 3-channel communication system comprises two antennas, a left antenna 105, and right antenna 107. Both antennas are configured to communicate bi-directionally with voice channels, VHF1 111, and VHF2 113, and data channel VHF3 115. Left antenna 105 is coupled to a wideband (WB) multi-channel VHF radio 101 (left radio). Right antenna 107 is coupled to wideband multi-channel VHF radio 103 (right radio). Radios 101 and 103 are coupled to audio control panel 141, radio tuning panel 143, and data link management unit 145.

Audio signals transmitted and received by the left radio 101 are coupled to audio control panel 141 as audio 1 input 131 for the transmitted signal and audio 1 output 133 for the received signal. Audio signals transmitted and received by right radio 103 are coupled to audio control panel 141 as audio 2 input 127 for the transmitted signal and audio 2 output 129 for the received signal. Audio control panel 141 selects the VHF radio to be connected to an audio interface device. In one embodiment, the audio interface devices are a pilot and co-pilot audio headsets 151 for voice COM over the VHF radios.

The data to be transmitted or received by the radios 101 and 103 are coupled to a data link communications management unit (CMU) 145 on a data out line 137 for received data, and a data in line 135 for data transmission. The data link communications management unit 145 hosts the data link applications, controls the selection of the frequency for the radio channel that is to operate in data mode, and manages the display of received uplink data messages and downlink data messages composed using a keypad or other visual interface device 153. The visual interface device 153 can be implemented as any display unit which is capable of displaying graphical content. Suitable exemplary display units include, but are not limited to, a display associated with the FMS/FMC itself, a multifunction display (MFD), a multipurpose control display unit (MCDU), and/or a display associated with the CMU/CMF. Suitable technologies for implementing the display unit 620 include, but not limited to, a cathode ray tube (CRT) display, an active matrix liquid crystal display (LCD), a passive matrix LCD, or plasma display unit.

Radios 101 and 103 are also coupled to radio tuning panel 143 via frequency and mode select line 139. Radio tuning panel 143 is used to select the VHF voice COM frequency in the 118-137 MHz band for each radio channel that is to operate in voice mode, and to select and switch the mode of operation of each operating channel between voice and data mode as needed via a control signal.

Radios 101 and 103 comprise wideband VHF receivers configured to receive all voice and data channels in the 118-137 MHz VHF COM band. Software defined demodulators are able to process simultaneously any two voice channels selected on the radio tuning panel and one data channel selected by the data link management unit. Furthermore, software defined data link and audio interface functions are able to dynamically select between the data messages and audio 2 input 129 received by the left and right receiver/demodulators.

The radios 101 and 103 also comprise narrowband single-carrier frequency (also referred to as single-channel) agile VHF transmitters able to switch and transmit on any VHF voice or data channel in the 118-137 MHz band. A software defined modulator is able to switch between voice channel or data channel modulation on command from either left or right radio control functions. Furthermore, software defined audio and data link interface functions are able to dynamically route voice audio or data link messages to the left or right transmitter/modulators.

A bi-directional serial bus 121 between left and right radios enables routing of transmit and receive audio, transmit downlink messages and receive uplink messages, selected voice and data channel frequency, push to talk signals and other control data. In one embodiment, this is a time division multiple access (TDMA) bi-direction serial bus.

Although the embodiment described in FIG. 1 is directed towards communication on three channels, two voice channels VHF1 111, and VHF2 113, and data channel VHF3 115, it is to be understood that the system is not limited to only three channels. A person having ordinary skill in the art will appreciate that the above described system can also be configured to communicate on more than three channels, and up to a number of channels as supported by hardware or operational constraints.

Figure 2:
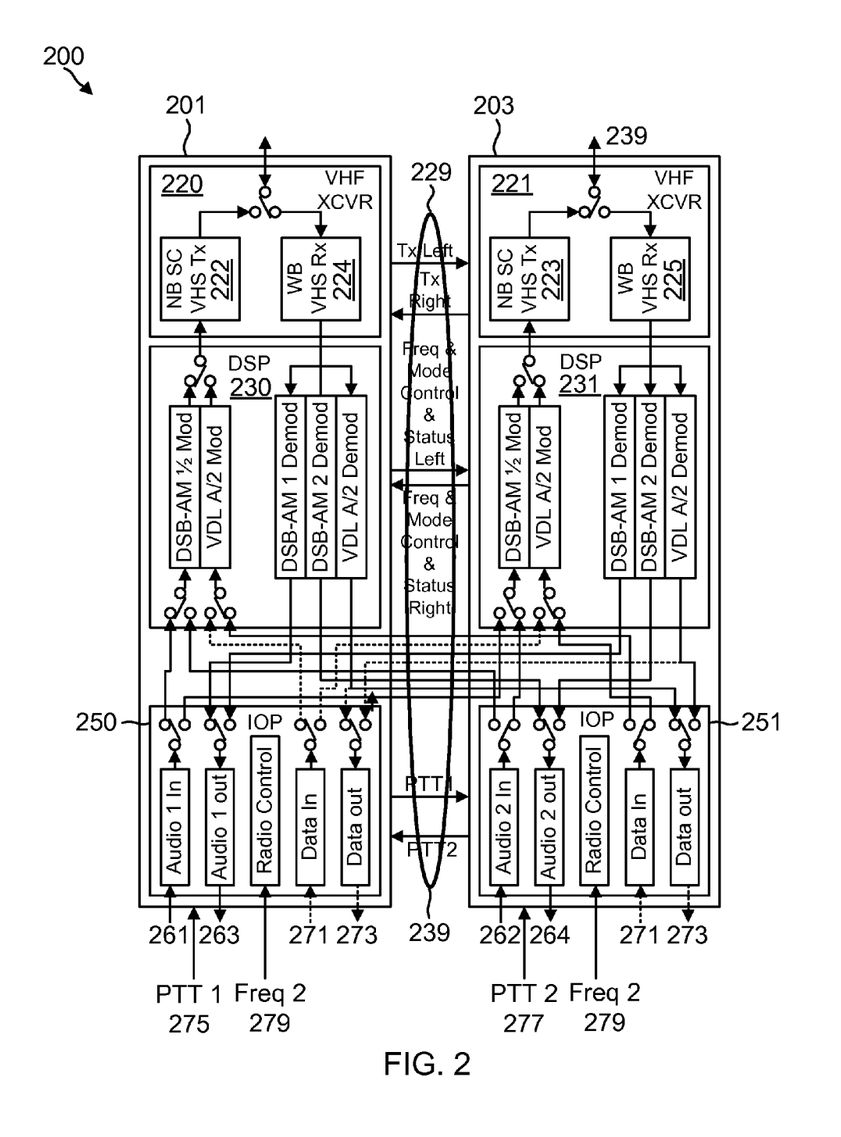
FIG. 2 illustrates one embodiment of VHF radios employing a wideband multi-channel receivers and narrowband single-carrier transmitters.

FIG. 2 illustrates one embodiment of a set of two VHF radios 200. The set of VHF radios comprise a left VHF radio 201 and right VHF radio 203. Radios 201 and 203 are coupled via TDMA Serial Bus Pair 239, used to transfer transmit and received traffic and control and status data. VHF radios 201 and 203 include VHF transceivers 220 and 221.

VHF transceivers 220 and 221 comprise wideband multichannel VHF receivers 224 and 225, and narrowband single-carrier frequency agile VHF transmitters 222 and 223. Wideband multi-channel VHF receivers 224 and 225 are configured to receive all voice and data channels in the 118-137 MHz band. Narrowband single-channel agile transmitters 224 and 225 are able to switch and transmit on any single VHF voice or data channel in the 118-137 MHz band. VHF transceivers are coupled via the TDMA bus 239 enabling routing of transmit and receive audio, and uplink and downlink messages.

Left VHF transceiver 220 is coupled to digital signal processor (DSP) 230 (left DSP). Right VHF transceiver 221 is coupled to DSP 231 (Right DSP). DSPs 230 and 231 comprise an amplitude modulator for voice signal transmission and a VHF Data Link (VDL) modulator for the data transmission. DSPs 230 and 231 also comprise two AM demodulators for voice demodulation and a VDL demodulator for data demodulation.

The DSPs 230 and 231 are coupled to input/output processors (IOPs) 250 and 251. The left DSP 230 is coupled to left IOP 250 via an internal bus and to IOP 251 via TDMA bus 239, and right DSP 231 is coupled to right IOP 251 via an internal bus and to IOP 250 via TDMA bus 239, such that transmit and received audio and data messages can be routed internally or between left and right radios. The IOPs 250 and 251 selects between received audio and data from the left VHF transceiver 220 and right VHF transceiver 221, and also can be used to select between left transceiver 220 and right transceiver 221 for the transmission of voice audio in and data. The audio signal at Audio 1 in 261 is supplied to amplitude modulators in either DSP 230 or 231, depending on which radio is to be used for voice audio 1 transmission. Likewise, Audio 2 in 262 can be supplied to amplitude modulators in either DSP 230 or 231. Audio 1 out 263 can switch between audio received from either amplitude demodulator 1 from DSP 230 or DSP 231, depending on which radio is operating in receive mode. Audio 2 out 264 can also switch between audio signals received from either amplitude demodulator 2, DSP 230 or DSP 231. In one embodiment, a single radio is designated as a primary data radio, for example the right radio, and the failure of the primary radio may be used to enable data transmission and reception in the back-up radio, in this case the left radio. Data in 271 provides datalink information/messages to be transmitted from IOP 250 or IOP 251, whichever is being used as the primary for data input/output, to VDL modulators in either DSP 230 or DSP 231, whichever is currently selected for data transmission. Data out 273 delivers received data messages from either IOPs 250 or 251, depending on whichever is being used as primary for data input/output. Radio control signals from a radio tuning panel are received by IOPs 250 and 251 at radio control 279. IOPs 250 and 251 also receive push to talk signals at PTT1 275, and PTT2 277. Assertion of either PTT is used to switch from receive to transmit, and select the AM modulator and applicable voice channel transmission frequency. IOPs 250 and 251 are coupled via TDMA bus 239, such that push to talk (PTT) signals, frequency and mode control, and transmitter/receiver status information can be routed between IOPs 250 and 251.

In the embodiments shown in FIGS. 1 and 2, data communication capabilities can be added to a 2 VHF voice radio and antenna configuration without the need for additional radios or antennas. The wideband multi-channel receivers 224 and 225 within multichannel radios 101, 103, 201, 203, and cross-radio bus 121, 239 allow seamless operation on three channels with no blocking of reception on any of the receiving channels when transmitting on any single channel. To prevent receiver desensitization, the ADC dynamic range (DR) must satisfy the following relationship:

$$DR > T_x \text{Output Power(dBm)} - \text{Receiver Sensitivity (dBm)} - \text{Isolation(dB)}$$

Cross radio wiring and sharing of control data 139/279 enable transmission on any second channel when transmission on one channel is ongoing. In one embodiment, aircraft wiring and interfaces to the audio control panel 141, radio tuning panel 143, and data link communications management unit 145 is the same as if three standalone radios were installed. Additional wiring is only required for the bi-directional bus 121, 239 between the two wideband multi-channel VHF radios 101 & 103, 201 & 203.

Figure 3:
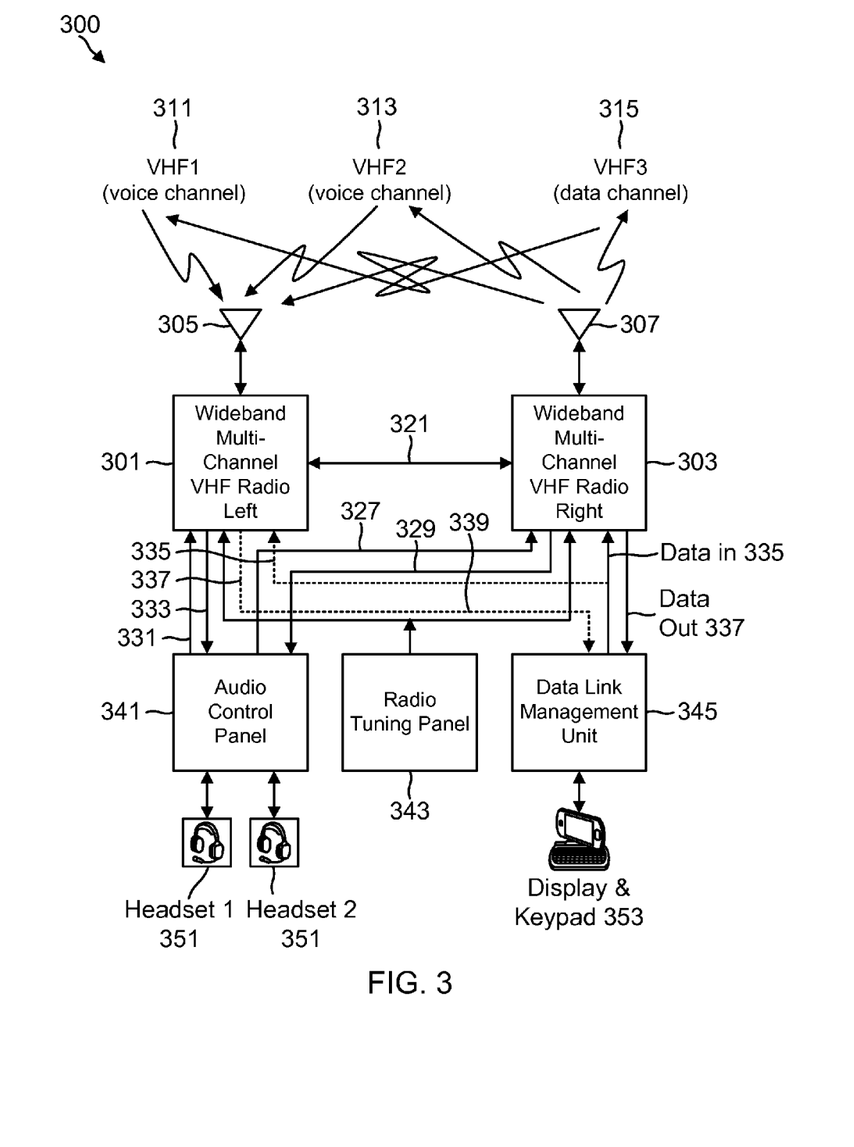
FIG. 3 illustrates an alternative embodiment of 3-channel communication system using two reconfigurable VHF radios with wideband multi-carrier transmitters.

FIG. 3 illustrates an alternative embodiment of a 3-channel communication system using two VHF radios 300. The 3-channel communication system comprises two antennas, a left antenna 305, and right antenna 307. Left antenna 305 is coupled to a wideband multi-channel VHF radio 301 (left radio). Right antenna 307 is coupled to wideband multi-channel VHF radio 303 (right radio). Left radio 301 is configured to receive voice communications and data communications from voice channels VHF1 311, and VHF2 313, and data channel VHF3 315. Right radio 303 is configured to transmit voice and data over channels VHF1 311, VHF2 313, and VHF3 315. Radios 301 and 303 are coupled to audio control panel 341, radio tuning panel 343, and data link management unit 345.

Audio signals transmitted by the left radio 301 via the right radio 303 and received by the left radio 301 are coupled to audio control panel 341 as audio 1 input 331 for the transmitted signal and audio 1 output 133 for the received signal. Audio signals transmitted by the right radio 303 and received by right radio 303 via the left radio 301 are coupled to audio control panel 341 as audio 2 input 327 for the transmitted signal and audio 2 output 329 for the received signal. Audio control panel 341 selects the VHF radio to be connected to the pilot and co-pilot audio headsets 351 for voice COM over the VHF radios.

The data to be transmitted or received by the radios 301 and 303 are coupled to data link management unit 345 on a data out line 337 for received data, and a data in line 335 for data transmission. The data link management unit 345 hosts the data link applications and manages the display of received uplink data messages and downlink data messages composed using a keypad or other interface device 353.

Radios 301 and 303 are also coupled to radio tuning panel 343 via frequency and mode select line 339. Radio tuning panel 343 is used to select the VHF voice COM frequency in the 118-137 MHz band for each radio channel that is to operate in voice mode, and to select and switch the mode of operation of each operating channel between voice and data mode as needed.

Radios 301 and 303 comprise wideband VHF receivers configured to receive all voice and data in channels in the 118-137 MHz VHF COM band. Software defined demodulators are able to process simultaneously any two voice channels selected on the radio tuning panel and one data channel selected by the data link communications management unit. Furthermore, software defined functions are able to dynamically route received data link messages and audio to data link interface and audio interface functions on the left and/or right radios for output to the audio panel and/or data link management function.

The radios 301 and 303 also comprise wideband multi-carrier highly-linear VHF transmitters able to simultaneously transmit on multiple VHF voice or data channels in the 118-137 MHz band. On power up, one radio is configured for receive operation, and the other for transmit operation. In one embodiment, the left radio is configured for receive operation and the right radio is configured for transmit operation. Upon failure of left or right radio, the healthy radio reverts to transmit and receive operation. A software defined modulator is able to modulate and multiplex up to two voice channels and one data channel, with audio and data from either left or right radios. Furthermore, software defined audio and data link interface functions are able to dynamically route voice audio or data link messages to the left or right transmitter/modulators.

A bi-directional serial bus 321 between left and right radios enables routing of transmit and receive audio, transmit downlink messages, and receive uplink messages and control data. In one embodiment, this is a time division multiple access (TDMA) bi-direction serial bus.

Although the embodiment described in FIG. 1 is directed towards communication on three channels, two voice channels VHF1 311, and VHF2 313, and data channel VHF3 315, it is to be understood that the system is not limited to only three channels. A person having ordinary skill in the art will appreciate that the above described system can also be configured to communicate on more than three channels, and up to a number of channels as supported by hardware or operational constraints.

Figure 4:
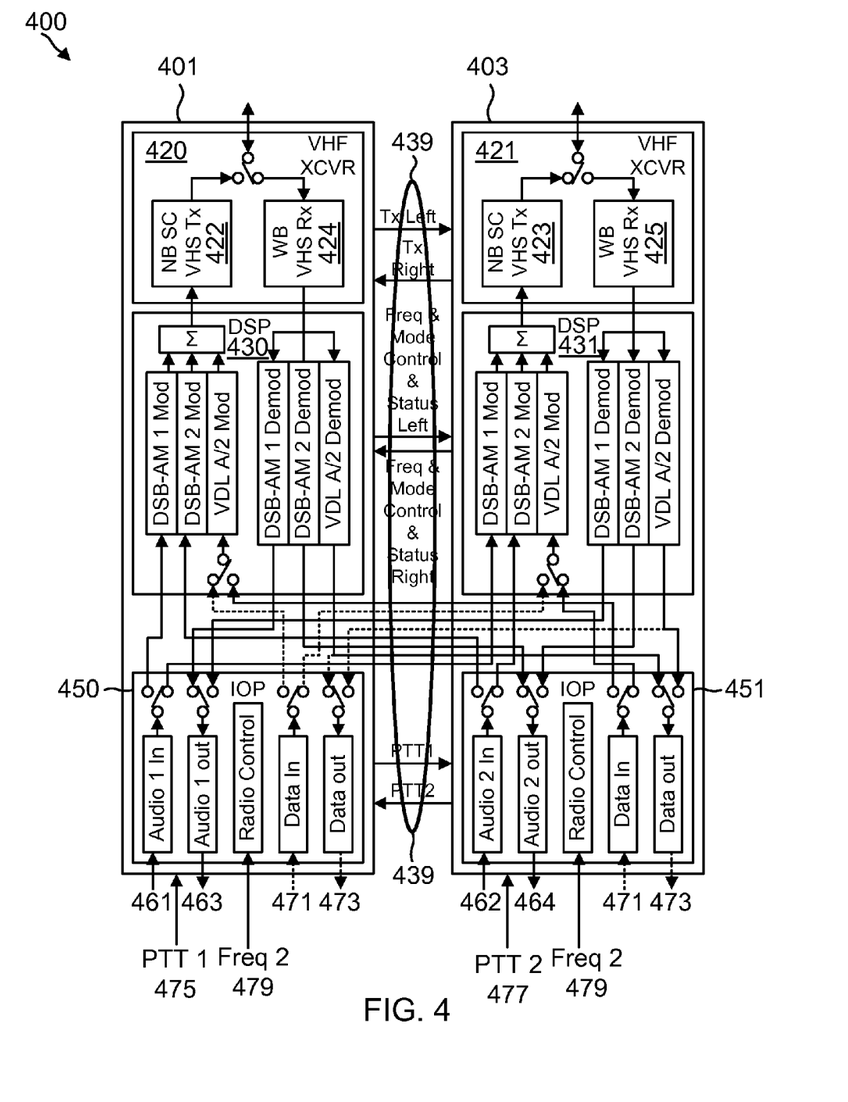
FIG. 4 illustrates one embodiment of a VHF radios employing wideband multi-channel receivers and wideband multi-carrier transmitters.

FIG. 4 illustrates alternative embodiment of a set of two VHF radios 400. The set of VHF radios comprise a left VHF radio 401 and right VHF radio 403. Radios 401 and 403 are coupled via TDMA Serial Bus Pair 439, used to transfer transmit and received traffic and control and status data. VHF radios 401 and 403 include VHF transceivers 420 and 421.

VHF transceivers 420 and 421 comprise wideband multi-channel VHF receivers 424 and 425, and wideband multi-carrier highly-linear VHF transmitters 422 and 423. Wideband multi-channel VHF receivers 424 and 425 are configured to receive all voice and data channels in the 118-137 MHz band. Wideband multi-carrier highly-linear VHF transmitters 424 and 425 are able to transmit simultaneously on multiple VHF voice or data channels in the 118-137 MHz band. VHF transceivers 420 and 421 are coupled via the TDMA bus 439 enabling routing of transmit and receive audio, and uplink and downlink messages.

Left VHF transceiver 420 is coupled to digital signal processor (DSP) 430 (left DSP). Right VHF transceiver 421 is coupled to DSP 431 (Right DSP). DSPs 430 and 431 comprise amplitude modulators for voice signal transmission on two channels, and a VDL modulator for the data transmission. DSPs 430 and 431 also comprise two AM demodulators for voice demodulation and a VDL demodulator for data demodulation. In one embodiment, the amplitude modulators are double sideband (DSB) AM modulators, and the amplitude demodulators are DSB amplitude demodulators. DSB-AM carriers modulated by audio inputs 1 and 2 and VDL data carrier modulated by data input are multiplexed digitally to provide multi-carrier input to the wideband transmitters 422, 423.

The DSPs 430 and 431 are coupled to both input/output processors (IOPs) 450 and 451. The left DSP 430 is coupled to left IOP 450 via an internal bus and to right IOP via TDMA bus 439 to transfer transmitted and received traffic, and control and status data, and right DSP 431 is coupled to right IOP 451, via an internal bus and to left IOP 450 via TDMA bus 439 to transfer transmitted and received traffic, and control and status data. On power-up, the left transceiver 420 is configured for receive operation, and the right transceiver 421 for transmit operation. A failure in left or right transceiver can trigger the working single radio to revert to both transmit and receive operation. In other embodiments, different configurations may be used, such as using the right transceiver for receive operation and left transceiver for transmit operation, or using both for both transmit and receive operation. The IOPs 450 and 451 select received audio and data from the left VHF receiver 424/DSP 430 and right VHF receiver 425/DSP 431, and also can be used to select between left VHF transmitter 422/DSP 430 and right VHF transmitter 423/DSP 431 for the transmission of data. Two audio channels and one data channel from the received channels in VHF band are demodulated simultaneously and distributed to left and/or right radio (401/403) for output. Audio 1 out 463, audio 2 out 464, and data out 273 are supplied by left transceiver 420, via left DSP 430 when the left transceiver 420 is configured for receive operation and are supplied by right transceiver 421 when the right transceiver is configured for receive operation. Audio 1 in 461, audio 2 in 462, and data in 471 are directed to right side DSP 431 and transmitter 423 when the right transceiver 421 is configured for transmit operation and are supplied to the left side DSP 430 and transmitter 422 when the right transceiver 421 is configured for receive operation. Radio control signals from a radio tuning panel are received by IOPs 450 and 451 at radio control 479. IOPs 450 and 451 also receive push to talk signals at PTT1 475, and PTT2 477 and routed to the right (or left) transmitter via TDMA bus 439 if the right side transceiver 421 (or left side transceiver 420) is configured for transmit operation.

Using a configuration which employs both a wideband receiver 424, 425, and wideband multi-carrier transmitter 422, 423, data capability can be added to standard 2VHF voice radio and antenna installations without the need for additional radios or antennas. The use of a wideband multi-carrier transmitter, and cross radio wiring and sharing of control data enables simultaneous transmission on one, two, or three channels. Wiring and interfaces to the audio control panel 341, radio tuning panel 343, and data link communications management unit 345 are the same as if three standalone VHF radios were installed. The only additional wiring required is for the bi-directional bus 321/439 between the two radios 301,303 and 401,403.

Figure 5:
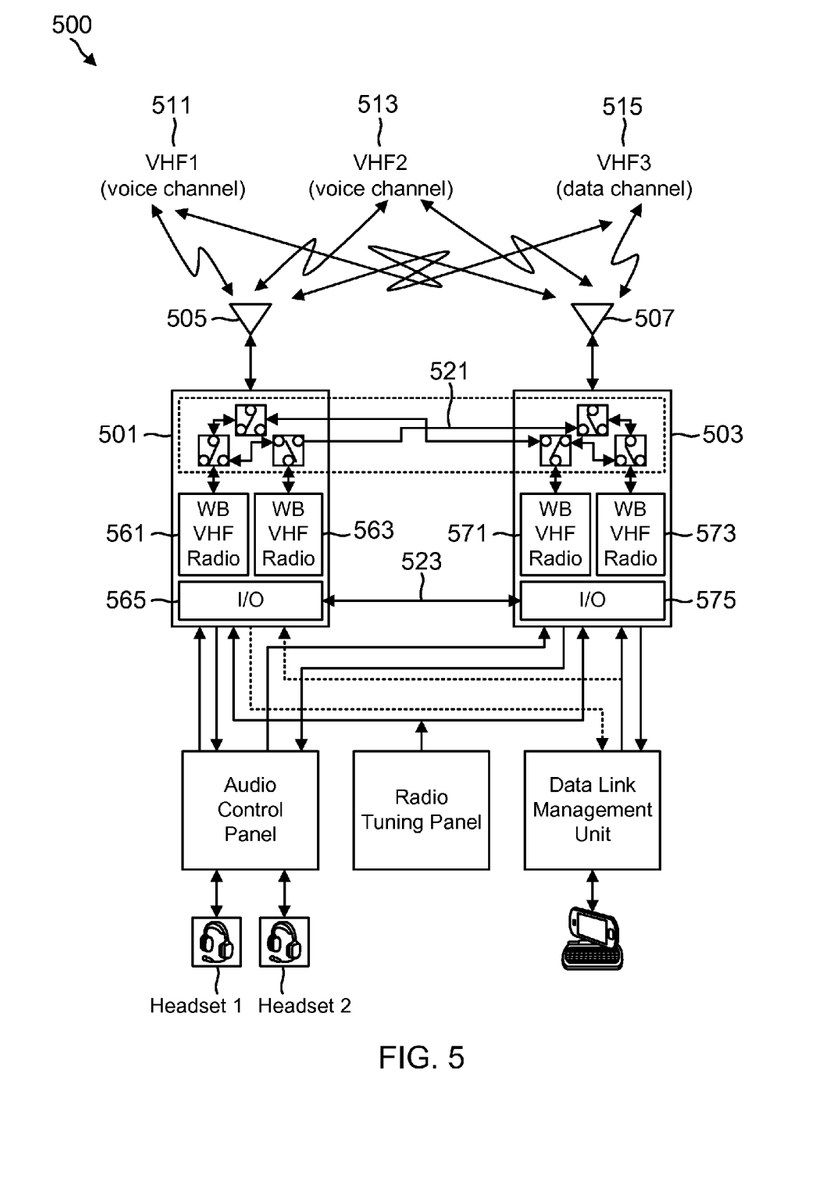
FIG. 5 illustrates an alternative embodiment of 3-channel communication system using two sets of redundant VHF radios.

FIG. 5 illustrates an alternative embodiment for achieving the dispatch reliability of three standalone VHF radios while using a reduced number of VHF antennas 500. Here, left radio unit 501, and right radio unit 503 each comprise two WB VHF radios. Left radio unit 501 includes WB VHF Radios 561 and 563. Right radio unit 503 includes WB VHF Radios 571 and 573. Dual, fully internally redundant wideband radios allow dispatch with no loss of functionality due to any one single failure other than I/O failures. RF switches 521 connect the internal WB VHF radios on left radio unit 501, or right radio unit 503 to either left antenna 505 or right antenna 507 as required and depending on failure detection and isolation logic. Full functionality is maintained with two failed radios, one in left radio unit 501, and one in right radio unit 503, with the remaining functioning left and right radios acting as a hot standby. In this configuration, only one voice channel function is lost with two right failed radios or two left failed radios. In other embodiments, when all of the VHF radios of the left or right radio units fail, the VHF radios of the functioning VHF radio units can provide the functionality of the failed radios, thus providing the full functionality of the failed VHF radios with no voice channel function losses.

The input/output signals 565, 575 are routed to and from both internal WB VHF radios, and a TDMA bi-directional serial bus 523 routes transmit and receive audio, transmit downlink and receive uplink messages, selected voice and data channel frequency, and push to talk signals between the left and right radios.

Although specific embodiments have been illustrated and described herein, it will be appreciated by those of ordinary skill in the art that any arrangement, which can achieve the same purpose, may be substituted for the specific embodiments shown. Therefore, it is manifestly intended that this invention be limited only by the claims and the equivalents thereof.

Example Embodiments

Example 1 includes a multichannel communication system comprising: a two-antenna radio device comprising: a left VHF radio unit comprising at least one left VHF radio, each of the at least one left VHF radio comprising a left VHF radio transceiver, the left VHF radio transceiver comprising a left wideband multi-channel receiver configured to receive all voice channels and data channels in an aeronautical VHF communication band, the at least one left VHF radio configured to communicate on at least two voice channels and at least one data channel; a left antenna communicatively coupled the left VHF radio unit; a right VHF radio unit comprising at least one right VHF radio, each of the at least one right VHF radio comprising a right VHF radio transceiver, the right VHF radio transceiver comprising a right wideband multi-channel receiver configured to receive all voice channels and data channels in an aeronautical VHF communication band, the at least one right VHF radio configured to communicate on at least any two voice channels and one data channel, the right VHF radio unit communicatively coupled to the left VHF radio unit via a bi-directional serial bus; a right antenna communicatively coupled to the right VHF radio unit; an audio control panel configured to select the left VHF radio unit or right VHF radio unit to connect to an audio interface device; a radio tuning panel coupled to the left VHF radio unit and right VHF radio unit, the radio tuning panel configured to: select between voice operation or data operation for each of the at least two voice channels and the at least one data channel; select a respective voice communication frequency for each of the at least two voice channels; and a data link management unit coupled to a visual interface device, the data link management unit configured to: select between the left radio unit or right radio unit for data exchange; select a data communication frequency for the data channel; cause the visual interface device to display received uplink data messages; and generate downlink data messages.

Example 2 includes the multichannel communication system of example 1 wherein: the left VHF radio transceiver further comprises a left narrowband single-channel VHF transmitter configured to switch between any one voice channel or one data channel in the aeronautical VHF communication band and transmit on a selected one voice channel or one data channel; and the right VHF radio transceiver further comprises a right narrowband single-channel VHF transmitter configured to switch between any one voice channel or one data channel in the aeronautical VHF communication band and transmit on a selected one voice channel or one data channel.

Example 3 includes the multichannel communication system of any of examples 1 or 2 wherein one of the left VHF radio unit or right VHF radio unit is a primary data radio, a remaining radio unit being a back-up data radio, wherein failure of the primary data radio enables data transmission and reception in the back-up data radio.

Example 4 includes the multichannel communication system of any of examples 1-3 wherein each of the at least one left VHF radio and at least one right VHF radio respectively further comprise: a digital signal processor comprising: a modulator configured to switch between voice channel modulation or data channel modulation; a demodulator configured to simultaneously demodulate any two voice channels and one data channel in the aeronautical VHF communication band; an input/output processor (IOP) configured to: route voice audio or data to the digital signal processor of the left narrowband single-channel VHF transmitter or the digital signal processor of the right narrowband single-channel VHF transmitter; select between voice audio and data received by the left VHF radio transceiver; and select between voice audio and data received by the right VHF radio transceiver; output the selected voice audio to the audio control panel; and output the selected data to the data link management unit.

Example 5 includes the multichannel communication system of example 4, wherein: the modulator comprises: a double-sideband amplitude modulation modulator for voice channel modulation; a VHF Data Link modulator for data channel modulations; the demodulator comprises: at least one double-sideband amplitude modulation demodulator for voice channel demodulation; and a VHF Data Link demodulator for data channel demodulation.

Example 6 includes the multichannel communication system of any of example 1 wherein: the left VHF radio transceiver further comprises a left wideband multi-carrier highly-linear VHF transmitter configured to transmit simultaneously on at least one voice channel, data channel, or combination of voice channel and data channel in the aeronautical VHF communication band; and the right VHF radio transceiver further comprises a right wideband multi-carrier highly-linear VHF transmitter configured to transmit simultaneously on at least one voice channel, data channel, or combination of voice channel and data channel in the aeronautical VHF communication band.

Example 7 includes the multichannel communication system of any of examples 1 or 6 wherein one of the left VHF radio unit or right VHF radio unit is configured for receive operation, a remaining radio unit configured for transmit operation, wherein failure of either left radio unit or right radio unit triggers both receive operation and transmit operation in a healthy remaining radio unit that has not failed.

Example 8 includes the multichannel communication system of any of examples 1, 6-7 wherein each of the at least one left VHF radio and at least one right VHF radio respectively further comprise: a digital signal processor comprising: a modulator configured to multiplex at least two voice channels, one voice channel and one data channel, or combination of two voice channels and one voice channel with voice audio and data from either left or right radio; a demodulator configured to simultaneously demodulate any two voice channels and one data channel in the aeronautical VHF communication band; an input/output processor (IOP) configured to: route at least one of voice audio or data to the digital signal processor of the left wideband multi-carrier highly-linear VHF transmitter or to the digital signal processor of the right wideband multi-carrier highly-linear VHF transmitter; select between voice audio and data received by the left VHF radio transceiver; select between voice audio and data received by the right VHF radio transceiver output the selected voice audio to the audio control panel; and output the selected data to the data link management unit.

Example 9 includes the multichannel communication system of any of examples 1, 6-8, having a first voice channel and a second voice channel, the left radio unit configured to provide voice audio for the first voice channel, the right radio unit provides voice audio for the second voice channel, wherein only the at least one left VHF radio or only the at least one right VHF radio receives both the first voice channel and second voice channel and distributes the first voice channel and second voice channel to the left VHF radio or right VHF radio.

Example 10 includes the multichannel communication system of any of examples 1-9, wherein radio frequency switches are configured to: communicatively couple the at least one left VHF radio to both the left antenna and the right antenna; communicatively couple the at least one right VHF radio to both the left antenna and the right antenna; wherein voice audio and data are routed to and from each of the at least one left radios and the at least one right radios.

Example 11 includes the multichannel communication system of any of examples 1-10, wherein: the left radio and right radio have a push-to-talk function, which when asserted, is configured to switch the left radio or right radio from receive operation to transmit operation, and select an applicable modulator and voice channel; and the left and right radio switch from receive operation to transmit operation when a downlink data message is provided by the data link management unit.

Example 12 includes the multichannel communication system of any of examples 1-11, wherein the bi-directional serial bus is a time division multiple access bus configured to route transmit audio and receive audio, transmit downlink and receive uplink data, selected voice and data channel frequency, and push to talk signals.

Example 13 includes a multichannel two antenna radio unit device comprising: a left VHF radio comprising a left VHF radio transceiver, the left VHF radio transceiver comprising a left wideband multi-channel receiver configured to receive all voice channels and data channels in an aeronautical VHF communication band, the left VHF radio configured to communicate on at least any two voice channels and one data channel; and a right VHF radio comprising a right VHF radio transceiver, the right VHF radio transceiver comprising a right wideband multi-channel receiver configured to receive all voice channels and data channels in an aeronautical VHF communication band, the right VHF radio configured to communicate on the at least any two voice channels and one data channel, the right VHF radio unit communicatively coupled to the left VHF radio unit via a bi-directional serial bus.

Example 14 includes the device of example 13, wherein: the left VHF radio transceiver further comprises a left narrowband single-channel VHF transmitter configured to switch between any one voice channel or one data channel in the aeronautical VHF communication band and transmit on a selected one voice channel or one data channel; and the right VHF radio transceiver further comprises a right narrowband single-channel VHF transmitter configured to switch between any one voice channel or one data channel in the aeronautical VHF communication band, and transmit on a selected one voice channel or one data channel.

Example 15 includes the device of any of examples 13 or 14, wherein one of either the left VHF radio unit or right VHF radio unit is a primary data radio, a remaining radio unit being a back-up data radio, wherein failure of the primary data radio enables data transmission and reception in the back-up data radio.

Example 16 includes the device of example 13, wherein: the left VHF radio transceiver further comprises a left wideband multi-carrier highly-linear VHF transmitter configured to transmit simultaneously on at least one voice channel, data channel, or combination of voice channel and data channel in the aeronautical VHF communication band; and the right VHF radio transceiver further comprises a right wideband multi-carrier highly-linear VHF transmitter configured to transmit simultaneously on at least one voice channel, data channel, or combination of voice channel and data channel in the aeronautical VHF communication band.

Example 17 includes the device of example 13 or 16 wherein one of either the left VHF radio unit or right VHF radio unit is configured for receive operation, a remaining radio unit configured for transmit operation, wherein failure of either left radio unit or right radio unit triggers both receive operation and transmit operation in a healthy remaining radio unit that has not failed.

Example 18 includes a multichannel two antenna redundant radio unit device comprising: at least two left VHF radios, each of the at least two left VHF radios comprising a left VHF radio transceiver, the left VHF radio transceiver comprising a left wideband multi-channel receiver configured to receive all voice channels and data channels in an aeronautical VHF communication band, the at least two left VHF radios configured to communicate on at least any two voice channels and one data channel, wherein if at least one, but less than all, of the at least two left VHF radios fails a still functioning left hot standby VHF radio of the at least two left VHF radios provides functionality of the at least two left VHF radios; at least two right VHF radios, each of the at least two right VHF radios comprising a right VHF radio transceiver, the right VHF radio transceiver comprising a right wideband multi-channel receiver configured to receive all voice channels and data channels in an aeronautical VHF communication band, the at least two right VHF radios configured to communicate on at least any two voice channels and one data channel, the at least two right VHF radio unit communicatively coupled to the at least two left VHF radio unit via a bi-directional serial bus, wherein if at least one, but less than all, of the at least two right VHF radios fails, a still functioning right hot standby VHF radio of the at least two right VHF radios provides functionality of the at least two right VHF radios; a left antenna; a right antenna; radio frequency switches configured to: communicatively couple the at least two left VHF radio to both the left antenna and the right antenna; communicatively couple the at least two right VHF radio to both the left antenna and the right antenna; wherein if all of the at least two left VHF radios fail, the at least two right VHF radios are configured to provide the functionality of the at least two left VHF radios; wherein if all of the at least two right VHF radios fail, the at least two left VHF radios are configured to provide the functionality of the at least two right VHF radios; wherein voice audio and data are routed to and from each of the at least two left radios and each of the at least two right radios.

Example 19 includes the device of example 18, wherein: the left VHF radio transceiver further comprises a left narrowband single-channel VHF transmitter configured to switch between any one voice channel or one data channel in the aeronautical VHF communication band and transmit on a selected one voice channel or one data channel; and the right VHF radio transceiver further comprises a right narrowband single-channel VHF transmitter configured to switch between any one voice channel or one data channel in the aeronautical VHF communication band, and transmit on a selected one voice channel or one data channel.

Example 20 includes the device of example 19, wherein: the left VHF radio transceiver further comprises a left wideband multi-carrier highly-linear VHF transmitter configured to transmit simultaneously on at least one voice channel, data channel, or combination of voice channel and data channel in the aeronautical VHF communication band; and the right VHF radio transceiver further comprises a right wideband multi-carrier highly-linear VHF transmitter configured to transmit simultaneously on at least one voice channel, data channel, or combination of voice channel and data channel in the aeronautical VHF communication band.

What is claimed is:

1. A multichannel communication system comprising:
   a two-antenna radio device comprising:
      a left very high frequency (VHF) radio unit comprising at least one left VHF radio, each of the at least one left VHF radio comprising a left VHF radio transceiver, the left VHF radio transceiver comprising a left wideband multi-channel receiver configured to receive all voice channels and data channels in an aeronautical VHF communication band, the at least one left VHF radio configured to communicate on at least two voice channels and at least one data channel;
      a left antenna communicatively coupled the left VHF radio unit;
      a right VHF radio unit comprising at least one right VHF radio, each of the at least one right VHF radio comprising a right VHF radio transceiver, the right VHF radio transceiver comprising a right wideband multi-channel receiver configured to receive all voice channels and data channels in an aeronautical VHF communication band, the at least one right VHF radio configured to communicate on at least any two voice channels and one data channel, the right VHF radio unit communicatively coupled to the left VHF radio unit via a bi-directional serial bus;
      a right antenna communicatively coupled to the right VHF radio unit;
   an audio control panel configured to select the left VHF radio unit or right VHF radio unit to connect to an audio interface device;

a radio tuning panel coupled to the left VHF radio unit and right VHF radio unit, the radio tuning panel configured to:
    select voice operation or data operation for each of the at least two voice channels and at least one data channel;
    select a respective voice communication frequency for each of the voice channels; and
a data link management unit coupled to a visual interface device, the data link management unit configured to:
    select the left VHF radio unit or right VHF radio unit for data communication;
    select a data communication frequency for the data channel;
    cause the visual interface device to display received uplink data messages; and
    generate downlink data messages.

2. The multichannel communication system of claim 1 wherein:
the left VHF radio transceiver further comprises a left narrowband single-channel VHF transmitter configured to switch between any one voice channel or one data channel in the aeronautical VHF communication band and transmit on a selected one voice channel or one data channel; and
the right VHF radio transceiver further comprises a right narrowband single-channel VHF transmitter configured to switch between any one voice channel or one data channel in the aeronautical VHF communication band and transmit on a selected one voice channel or one data channel.

3. The multichannel communication system of claim 2 wherein one of the left VHF radio unit or right VHF radio unit is a primary data radio, a remaining radio unit being a back-up data radio, wherein failure of the primary data radio enables data transmission and reception in the back-up data radio.

4. The multichannel communication system of claim 2 wherein each of the at least one left VHF radio and at least one right VHF radio respectively further comprise:
a digital signal processor comprising:
    a modulator configured to switch between voice channel modulation or data channel modulation;
    a demodulator configured to simultaneously demodulate any two voice channels and one data channel in the aeronautical VHF communication band;
an input/output processor (IOP) configured to:
    route voice audio or data to the digital signal processor of the left narrowband single-channel VHF transmitter or the digital signal processor of the right narrowband single-channel VHF transmitter;
    select between voice audio and data received by the left VHF radio transceiver;
    select between voice audio and data received by the right VHF radio transceiver;
    output the selected voice audio to the audio control panel; and
    output the selected data to the data link management unit.

5. The multichannel communication system of claim 4, wherein:
the modulator comprises:
    a double-sideband amplitude modulation modulator for voice channel modulation;
    a VHF Data Link modulator for data channel modulations;
the demodulator comprises:
    at least one double-sideband amplitude modulation demodulator for voice channel demodulation; and
    a VHF Data Link demodulator for data channel demodulation.

6. The multichannel communication system of claim 1 wherein:
the left VHF radio transceiver further comprises a left wideband multi-carrier highly-linear VHF transmitter configured to transmit simultaneously on at least one voice channel, data channel, or combination of voice channel and data channel in the aeronautical VHF communication band; and
the right VHF radio transceiver further comprises a right wideband multi-carrier highly-linear VHF transmitter configured to transmit simultaneously on at least one voice channel, data channel, or combination of voice channel and data channel in the aeronautical VHF communication band.

7. The multichannel communication system of claim 6 wherein one of the left VHF radio unit or right VHF radio unit is configured for receive operation, a remaining radio unit configured for transmit operation, wherein failure of either left radio unit or right radio unit triggers both receive operation and transmit operation in a healthy remaining radio unit that has not failed.

8. The multichannel communication system of claim 6 wherein each of the at least one left VHF radio and at least one right VHF radio respectively further comprise:
a digital signal processor comprising:
    a modulator configured to multiplex at least two voice channels, one voice channel and one data channel, or combination of two voice channels and one voice channel with voice audio and data from either left or right radio;
    a demodulator configured to simultaneously demodulate any two voice channels and one data channel in the aeronautical VHF communication band;
an input/output processor (IOP) configured to:
    route at least one of voice audio or data to the digital signal processor of the left wideband multi-carrier highly-linear VHF transmitter or to the digital signal processor of the right wideband multi-carrier highly-linear VHF transmitter;
    select between voice audio and data received by the left VHF radio transceiver;
    select between voice audio and data received by the right VHF radio transceiver;
    output the selected voice audio to the audio control panel; and
    output the selected data to the data link management unit.

9. The multichannel communication system of claim 6 having a first voice channel and a second voice channel, the left radio unit configured to provide voice audio for the first voice channel, the right radio unit provides voice audio for the second voice channel, wherein only the at least one left VHF radio or only the at least one right VHF radio receives both the first voice channel and second voice channel and distributes the first voice channel and second voice channel to the left VHF radio or right VHF radio.

10. The multichannel communication system of claim 1, wherein radio frequency switches are configured to:
    communicatively couple the at least one left VHF radio to both the left antenna and the right antenna;
    communicatively couple the at least one right VHF radio to both the left antenna and the right antenna;
    wherein voice audio and data are routed to and from each of the at least one left radios and the at least one right radios.

11. The multichannel communication system of claim 1 wherein:
the left radio and right radio have a push-to-talk function, which when asserted, is configured to switch the left radio or right radio from receive operation to transmit operation, and select an applicable modulator and voice channel; and
the left and right radio switch from receive operation to transmit operation when a downlink data message is provided by the data link management unit.

12. The multichannel communication system of claim 1 wherein the bi-directional serial bus is a time division multiple access bus configured to route transmit audio and receive audio, transmit downlink and receive uplink data, selected voice and data channel frequency, and push to talk signals.

13. A multichannel two antenna radio unit device comprising:
a left very high frequency (VHF) radio comprising a left VHF radio transceiver, the left VHF radio transceiver comprising a left wideband multi-channel receiver configured to receive all voice channels and data channels in an aeronautical VHF communication band, the left VHF radio configured to communicate on at least two voice channels and at least one data channel; and
a right VHF radio comprising a right VHF radio transceiver, the right VHF radio transceiver comprising a right wideband multi-channel receiver configured to receive all voice channels and data channels in an aeronautical VHF communication band, the right VHF radio configured to communicate on the at least two voice channels and the at least one data channel, the right VHF radio unit communicatively coupled to the left VHF radio unit via a bi-directional serial bus.

14. The device of claim 13, wherein:
the left VHF radio transceiver further comprises a left narrowband single-channel VHF transmitter configured to switch between any one voice channel or one data channel in the aeronautical VHF communication band and transmit on a selected one voice channel or one data channel; and
the right VHF radio transceiver further comprises a right narrowband single-channel VHF transmitter configured to switch between any one voice channel or one data channel in the aeronautical VHF communication band, and transmit on a selected one voice channel or one data channel.

15. The device of claim 14, wherein one of either the left VHF radio unit or right VHF radio unit is a primary data radio, a remaining radio unit being a back-up data radio, wherein failure of the primary data radio enables data transmission and reception in the back-up data radio.

16. The device of claim 13, wherein:
the left VHF radio transceiver further comprises a left wideband multi-carrier highly-linear VHF transmitter configured to transmit simultaneously on at least one voice channel, data channel, or combination of voice channel and data channel in the aeronautical VHF communication band; and
the right VHF radio transceiver further comprises a right wideband multi-carrier highly-linear VHF transmitter configured to transmit simultaneously on at least one voice channel, data channel, or combination of voice channel and data channel in the aeronautical VHF communication band.

17. The device of claim 16 wherein one of either the left VHF radio unit or right VHF radio unit is configured for receive operation, a remaining radio unit configured for transmit operation, wherein failure of either left radio unit or right radio unit triggers both receive operation and transmit operation in a healthy remaining radio unit that has not failed.

18. A multichannel two antenna redundant radio unit device comprising:
at least two left very high frequency (VHF) radios, each of the at least two left VHF radios comprising a left VHF radio transceiver, the left VHF radio transceiver comprising a left wideband multi-channel receiver configured to receive all voice channels and data channels in an aeronautical VHF communication band, the at least two left VHF radios configured to communicate on at least two voice channels and at least one data channel, wherein if at least one, but less than all, of the at least two left VHF radios fails a still functioning left hot standby VHF radio of the at least two left VHF radios provides functionality of the at least two left VHF radios;
at least two right VHF radios, each of the at least two right VHF radios comprising a right VHF radio transceiver, the right VHF radio transceiver comprising a right wideband multi-channel receiver configured to receive all voice channels and data channels in an aeronautical VHF communication band, the at least two right VHF radios configured to communicate on the at least two voice channels and the at least one data channel, the at least two right VHF radio unit communicatively coupled to the at least two left VHF radio unit via a bi-directional serial bus, wherein if at least one, but less than all, of the at least two right VHF radios fails, a still functioning right hot standby VHF radio of the at least two right VHF radios provides functionality of the at least two right VHF radios;
radio frequency switches configured to:
communicatively couple the at least two left VHF radios to both a left antenna and a right antenna;
communicatively couple the at least two right VHF radios to both said left antenna and said right antenna;
wherein if all of the at least two left VHF radios fail, the at least two right VHF radios are configured to provide the functionality of the at least two left VHF radios;
wherein if all of the at least two right VHF radios fail, the at least two left VHF radios are configured to provide the functionality of the at least two right VHF radios;
wherein voice audio and data are routed to and from each of the at least two left radios and each of the at least two right radios.

19. The device of claim 18, wherein:
each of the at least two left VHF radio transceiver comprises a left narrowband single-channel VHF transmitter configured to switch between any one voice channel or one data channel in the aeronautical VHF communication band and transmit on a selected one voice channel or one data channel; and
each of the at least two right VHF radio transceiver comprises a right narrowband single-channel VHF transmitter configured to switch between any one voice channel or one data channel in the aeronautical VHF communication band, and transmit on a selected one voice channel or one data channel.

20. The device of claim 19, wherein:
each of the at least two left VHF radio transceiver comprises a left wideband multi-carrier highly-linear VHF transmitter configured to transmit simultaneously on at least one voice channel, data channel, or combination of voice channel and data channel in the aeronautical VHF communication band; and each of the at least two right VHF radio transceiver comprises a right wideband multi-carrier highly-linear VHF transmitter configured to transmit simultaneously on at least one voice channel, data channel, or combination of voice channel and data channel in the aeronautical VHF communication band.

\* \* \* \* \*